United States Patent [19]

Neff et al.

[11] 4,169,132

[45] Sep. 25, 1979

[54] TRIS-TETRAFLUORAMMONIUM HEXAFLUORALUMINATE AND ITS METHOD OF PREPARATION

[75] Inventors: Joseph A. Neff, San Clemente; William D. English, Orange, both of Calif.

[73] Assignee: TRW Inc., Redondo Beach, Calif.

[21] Appl. No.: 879,635

[22] Filed: Feb. 21, 1978

[51] Int. Cl.$^2$ .............................................. C01B 21/18
[52] U.S. Cl. .................................. 423/351; 423/465; 149/19.3
[58] Field of Search ............... 423/351, 463, 464, 465; 149/19.3, 19.4, 109.2, 109.4

[56] References Cited

U.S. PATENT DOCUMENTS

| | | | |
|---|---|---|---|
| 2,981,597 | 4/1961 | Tarbutton et al. | 423/465 |
| 3,032,400 | 5/1962 | Marsh | 423/351 |
| 3,635,659 | 1/1972 | Kidde | 423/465 |
| 3,694,150 | 9/1972 | Kidde | 423/465 |

OTHER PUBLICATIONS

Christe et al., Inorganic Halogen Oxidizer Research, 1/26/76, pp. 10-11.
Tolberg et al., The Synthesis of NF$_4$ Salts, Stanford Research Institute.

*Primary Examiner*—O. R. Vertiz
*Assistant Examiner*—Thomas W. Roy
*Attorney, Agent, or Firm*—Christie, Parker & Hale

[57] ABSTRACT

Tris-tetrafluorammonium hexafluoraluminate, (NF$_4$)$_3$AlF$_6$, a new compound, is synthesized by forming a mixture of solid aluminum trichloride in a solution of a molar excess tetrafluorammonium bifluoride in anhydrous hydrogen fluoride, at a temperature of about $-78°$ C. or less. The mix is then rapidly heated to a temperature of about 40° C. to the decomposition temperature of the product until all the solids dissolve. The solution containing the dissolved aluminum trichloride is evaporated under vacuum conditions to cause crystallization of (NF$_4$)$_3$AlF$_6$.

7 Claims, No Drawings

TRIS-TETRAFLUORAMMONIUM HEXAFLUORALUMINATE AND ITS METHOD OF PREPARATION

BACKGROUND OF THE INVENTION

Besides other applications for oxidizers such as $NF_3$ and $F_2$, a use has been as oxidizers in chemical lasers energized from solid gas generators. As typical of such operations, a charge to the solid gas generator is primarily a salt of $NF_4$ with a non-metal fluoride compounded with a binder, a solid fuel and a scavenger. The binder holds the composition together while the fuel reacts with a part of the $NF_4$ salt releasing enough heat to cause the remainder of the salt to decompose to $NF_3$, $F_2$ and $N_2$. The scavenger reacts with a non-metal fluoride to prevent its volatization. Typical of the salts currently used are $NF_4SbF_6$, and $NF_4BF_4$ with the latter most commonly used.

The yield of oxidizers from current $NF_4$ salts is not great on a unit weight basis. This reduces the utility of supply oxidizer systems in their capacity to introduce in a unit weight charge an effective net weight of oxidizer. The best available material, $NF_4BF_4$, has a maximum theoretical yield of 53.7 percent by weight $F_2$ based on the weight of $NF_4BF_4$ by the following calculation:

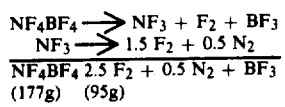

Maximum w/w yield $95 \div 177 \times 100 = 53.7\%$

If one mole of sodium fluoride is used as a scavenger, conversion drops to 43.4 percent by weight by weight basis.

A need therefore exists to provide sources of fluorine oxidizers which have a higher fluorine yield than existing salts.

SUMMARY OF THE INVENTION

It is provided in accordance with the instant invention, as a source of fluorine, the compound tris-tetrafluorammonium hexafluoraluminate, which is prepared by forming in the absence of water and $CO_2$ at a temperature of about $-78°$ C. or less a mixture of aluminum trichloride in a solution of tetrafluorammonium bifluoride in anhydrous hydrogen fluoride. To minimize side reaction and assure maximum conversion of the aluminum trichloride, at least a molar excess of tetrafluorammonium bifluoride over that stoichiometrically required for reaction with aluminum trichloride is present. The molar excess must be at least 1.8 and may range from about 1.8 to about 5, preferably 1.8 to 2.2. The solution is then rapidly heated from $-78°$ C. to a temperature of from about 40° C. to below the decomposition temperature of $(NF_4)_3AlF_6$, preferably from 40° C. to 60° C. for a time sufficient to dissolve the aluminum trichloride. Solution of the aluminum trichloride can be aided by stirring. Once the aluminum trichloride is in solution, the solution is subjected to vacuum distillation of hydrogen fluoride and chlorine to form a precipitate containing tris-tetrafluorammonium hexafluoraluminate.

DETAILED DESCRIPTION

In accordance with the present invention there is provided the compound tris-tetrafluorammonium hexafluoraluminate $(NF_4)_3AlF_6$.

The new compound is stable at room temperature to about 74° C. At temperatures above about 74° C. the compound decomposes to yield $NF_3$, $F_2$, and $AlF_3$. It proves, on a weight basis, a valuable oxidizer source for chemical lasers and the like.

To prepare $(NF_4)_3AlF_6$, solid aluminum trichloride is first combined with a solution of tetrafluorammonium bifluoride in anhydrous hydrogen fluoride at an initial temperature below that at which side reactions of aluminum trichloride and hydrogen fluoride will occur. An example of such side reaction is the reaction of aluminum trichloride to yield aluminum trifluoride. A convenient operating temperature is a temperature of a dry ice bath ($-78°$ C.) or less. While temperatures below $-78°$ C. may be used, the solution in which the solids are mixed tends to become too viscous, presenting processing difficulties.

After mixing, the reactants are heated rapidly to a temperature of from about 40° C. to below the decomposition temperature of the product, preferably from about 40° to about 60° C. At such temperatures, the product $(NF_4)_3AlF_6$ is formed mainly to the exclusion of by-products by a reaction which may be written as:

The released hydrogen is believed combined with fluorine. The amount of tetrafluorammonium bifluoride is provided in a quantity sufficient to donate the necessary amount of fluorine to the aluminum and oxidize the chloride to chlorine gas which is evolved along with hydrogen fluoride in an ensuing evaporative vacuum distillation. To minimize side reactions the amount of tetrafluorammonium bifluoride provided is at least about 1.8 times the stoichiometric amount required for reaction with $AlCl_3$. While a molar excess of about 1.8 to 5 may be used, the preferred range is from about 1.8 to 5 may be used, the preferred range is from about 1.8 to about 2.2.

Reaction at temperatures below 40° C. may be carried out but the rate of reaction has been found to be slow enhancing the opportunity for side reactions to occur.

Once the aluminum trichloride enters into solution, the solution is subjected to a vacuum distillation to draw off the chlorine and hydrogen fluoride to precipitate the solid product $(NF_4)_3AlF_6$.

The procedure must be accomplished in the absence of moisture and carbon dioxide. The presence of oxygen at this juncture is permissible, though undesired.

Tris-tetrafluorammoniaum hexafluoraluminate is a source of the oxidizers $NF_3$ and $F_2$ with aluminum trifluoride being a by-product.

Applications include its utility as source of oxidizers in high energy chemical lasers and as an oxidizer for solid propellants. The advantage of tris-tetrafluorammonium hexafluoraluminate is in the high yield of oxidizer per unit weight of compound. As compared to $NF_4BF_4$ which yields, as indicated above, a maximum of 53.7 percent of fluorine upon decomposition, $(NF_4)_3AlF_6$ provides, on decomposition, 69.3 percent by weight of fluorine by the reactions:

$$\begin{array}{rl} (NF_4)_3AlF_6 \longrightarrow & 3NF_3 + 3F_2 + AlF_3 \\ 3NF_3 \longrightarrow & 4.5F_2 + 1.5N_2 \\ \hline (NF_4)_3AlF_6 \longrightarrow & 7.5F_2 + 1.5N_2 + AlF_3 \\ (411) & (285) \end{array}$$

Maximum w/w yield = $285 \div 41 \times 100 = 69.3\%$

The effective mass and molar amount of available fluorine is thus about 300 percent more than $NF_4BF_4$. The compound is, moreover, stable at 160° F., the accepted weapons storage temperature.

$(NF_4)_3AlF_6$ has been found to pyrolyze smoothly at elevated temperatures to yield oxidizers with no need of a scavenger for by-products as is the case for $BF_3$ or $SbF_5$ as formed in the pyrolysis of $NF_4BF_4$ and $NF_4SbF_6$.

While nowise limiting the following example illustrates the preparation of tris-tetrafluorammonium hexafluoraluminate.

EXAMPLE 1

In the following synthesis, the apparatus employed was constructed of Teflon TM FEP[a] with the apparatus protected against introduction of ambient air and moisture. There was placed 1.4 g of solid $AlCl_3$ in a reaction vessel cooled to $-78°$ C. To the reaction vessel there was then added 25 ml of $NF_4HF_2$ in solution in anhydrous HF also at $-78°$ C. The solution provided $NF_3$ in an equivalence of 0.20 g $NF_3$/cc of solution. The mixture was agitated to wet the solids and the reactor transferred to a water bath maintained at 45° C. The contents of the reactor were periodically agitated to achieve gradual solution of the solids present. As soon as all of the solids were dissolved, the reactor was removed from the water bath and attached to a manifold providing a dynamic vacuum. The vacuum draw caused HF to boil from the solution with attendant cooling of the solution. A trace of by-product $AlF_3$ precipitated at this time. When the volume of the solution was reduced by about two-thirds, a white precipitate began to form. The dynamic vacuum was maintained for 18 hours. At the end of this time, the product was a sticky white solid which weighed 6.9 grams. A portion, (5.9 g) of the sticky white solid, was dried at 100° C. under vacuum for two hours to give 3.8 grams of a fine, white, free-flowing powder. The powder consisted of 78.9% by weight $(NF_4)_3AlF_6$. The chief impurities were $CsHF_2$ (14.6% by weight) and $NF_4SbF_6$ (2.9% by weight) as introduced by the $NF_4HF_2$ solution. The product was stable at room temperature and 165° F. (73.78° C.). Slightly above about 165° F. the product decomposed to $NF_3$, $F_2$ and $AlF_3$. Product analysis was determined by a procedure as described in Example 2.

[a] Fluorinated Ethylene Propylene

EXAMPLE 2

The procedure of Example 1 was repeated except that the mixture, after being formed in a dry ice bath, was removed, allowed to heat to ambient temperature and then transferred to the water bath for rapid heating to a temperature of about 45° C. Again a fine, white, free-flowing powder was obtained.

To analyze for $(NF_4)AlF_6$, a sample weighing 0.8248/g was hydrolyzed. The amount of $NF_3$ released in hydrolysis was 0.2900/g, establishing an $NF_3$ content of 35.16% by weight. As the theoretical content of $NF_3$ in $(NF_4)_3AlF_6$ is 51.83% by weight, purity was established to be 67.8%.

The other elements present were determined by atomic absorption on the hydrolysis solution as follows: Al=4.68% by weight, Sb=2.45% by weight, Cs=1.74% by weight. The theoretical content of Al is 6.57% by weight giving an Al purity of 71.2% by weight. The Cs corresponds to 5.21% $CsSbF_6$. The Sb is in excess of that required for stoichiometry with Cs; the excess corresponds to 1.27% excess of $SbF_6$. The excess of Al over that required for $(NF_4)_3AlF_6$ corresponds to 10.5% $AlF_3$. The total assignment of species was:

$(NF_4)_3AlF_6$=67.8% by weight, $AlF_3$=10.6% by weight, $CsSbF_6$=5.2% by weight, $SbF_6$=1.3% by weight, for a total of 85% by weight.

The remaining 15% was not accounted for.

What is claimed is:

1. Tris-tetrafluorammonium hexafluoraluminate.

2. A method for preparing tris-tetrafluorammonium hexafluoraluminate which comprises in the absence of $CO_2$ and water:

(a) forming at a temperature of about $-78°$ C. or less a mixture of solid aluminum trichloride in a solution of tetrafluorammonium bifluoride in anhydrous hydrogen fluoride, the amount of tetrafluorammonium bifluoride provided being at least about 1.8 times the molar amount required to stoichiometrically react with the aluminum trichloride;

(b) rapidly heating the mixture to a temperature of from about 40° C. to below the decomposition temperature of tris-tetrafluorammonium hexafluoraluminate for a time sufficient to dissolve the aluminum trichloride, (c) subjecting the solution to vacuum distillation to remove hydrogen fluoride and chlorine to form a precipitate containing tris-tetrafluorammonium hexafluoraluminate.

3. The method of claim 2 in which the mixture of solid aluminum trichloride and tetrafluorammonium bifluoride in anhydrous hydrogen fluoride is heated to a temperature from about 40° to about 60° C. to dissolve the aluminum trichloride.

4. The method of claim 2 in which the tetrafluorammonium bifluoride is provided in an amount of from about 1.8 to 5 times the molar amount required to stoichiometrically react with the aluminum trichloride.

5. The method of claim 2 in which the tetrafluoramounium bifluoride is provided in an amount of from about 1.8 to about 2.2 times the molar amount required to stoichiometrically react with the aluminum trichloride.

6. The method of claim 3 in which the tetrafluorammonium bifluoride is provided in an amount of from about 1.8 to 5 times the molar amount required to stoichiometrically react with the aluminum trichloride.

7. The method of claim 3 in which the tetrafluorammonium bifluoride is provided in an amount of from about 1.8 to about 2.2 times the molar amount required to stoichiometrically react with the aluminum trichloride.